US010590227B2

(12) United States Patent
Putzien et al.

(10) Patent No.: US 10,590,227 B2
(45) Date of Patent: Mar. 17, 2020

(54) CURABLE ORGANIC POLYMER COMPRISING AT LEAST ONE ACYLUREA UNIT, ITS PREPARATION AND USE

(71) Applicant: Construction Research & Technology, GmbH, Trostberg (DE)

(72) Inventors: Sophie Putzien, Ampfing (DE); Burkhard Walther, Taching am See (DE); Heimo Woelfle, Traunstein (DE)

(73) Assignee: Construction Research & Technology GmbH, Trostberg (DE)

( * ) Notice: Subject to any disclaimer, the term of this patent is extended or adjusted under 35 U.S.C. 154(b) by 121 days.

(21) Appl. No.: 15/507,299

(22) PCT Filed: Jul. 23, 2015

(86) PCT No.: PCT/EP2015/066837
§ 371 (c)(1),
(2) Date: Feb. 28, 2017

(87) PCT Pub. No.: WO2016/041666
PCT Pub. Date: Mar. 24, 2016

(65) Prior Publication Data
US 2017/0253687 A1 Sep. 7, 2017

(30) Foreign Application Priority Data
Sep. 17, 2014 (EP) .................................... 14185105

(51) Int. Cl.
C08G 18/10 (2006.01)
C08G 18/02 (2006.01)
C08G 18/76 (2006.01)
C08G 18/28 (2006.01)
C09D 175/04 (2006.01)
C08G 18/79 (2006.01)
C08G 18/00 (2006.01)
C08G 18/74 (2006.01)

(52) U.S. Cl.
CPC ......... C08G 18/025 (2013.01); C08G 18/003 (2013.01); C08G 18/281 (2013.01); C08G 18/74 (2013.01); C08G 18/7621 (2013.01); C08G 18/797 (2013.01); C09D 175/04 (2013.01)

(58) Field of Classification Search
CPC .. C08G 18/797; C08G 18/74; C08G 18/7621; C08G 18/281
See application file for complete search history.

(56) References Cited

U.S. PATENT DOCUMENTS

| 4,028,310 | A | 6/1977 | Schafer et al. |
| 4,172,836 | A | 10/1979 | Schafer et al. |
| 4,321,172 | A * | 3/1982 | Lin ..................... C08G 18/025 |
| | | | 204/500 |
| 4,328,138 | A * | 5/1982 | Lin ..................... C08G 18/025 |
| | | | 525/451 |
| 5,081,211 | A | 1/1992 | Cassidy et al. |
| 9,309,218 | B2 | 4/2016 | Woelfle et al. |
| 2007/0106048 | A1 * | 5/2007 | Bernard ............... C08G 18/168 |
| | | | 528/44 |
| 2011/0015072 | A1 | 1/2011 | Hechavarria Fonseca et al. |
| 2015/0051365 | A1 | 2/2015 | Woelfle et al. |
| 2015/0353521 | A1 | 12/2015 | Wolfle et al. |
| 2017/0008871 | A1 | 1/2017 | Putzien et al. |

FOREIGN PATENT DOCUMENTS

| DE | 27 14 293 A1 | 10/1978 |
| DE | 43 18 979 A1 | 12/1994 |
| EP | 0 361 675 A1 | 4/1990 |
| EP | 2 628 530 A1 | 8/2013 |
| EP | 2 762 471 A1 | 8/2014 |
| EP | 2 915 808 A1 | 9/2015 |
| GB | 1 516 517 | 7/1978 |
| WO | WO-9608524 A1 * | 3/1996 ......... C08G 18/0823 |

(Continued)

OTHER PUBLICATIONS

PCT/EP2015/086837—International Search Report, dated Nov. 18, 2015.
PCT/EP2015/066837—International Written Opinion, dated Nov. 18, 2015.
DeLos, F., et al., "Reactions of Carbodiimides. I. The Mechanisms of the Reactions of Acetic Acid with Dicyclohexylcarbodiimide [1,2]", Journal of American Chemical Society, Mar. 1, 1966, p. 1013-1019, vol. 88, Issue, 5. Abstract Only.

(Continued)

Primary Examiner — Michael L Leonard
(74) Attorney, Agent, or Firm — Curatolo Sidoti Co., LPA; Salvatore A. Sidoti; Floyd Trillis, III

(57) ABSTRACT

The present invention suggests a curable organic polymer comprising at least one acylurea unit represented by structural formula (I):

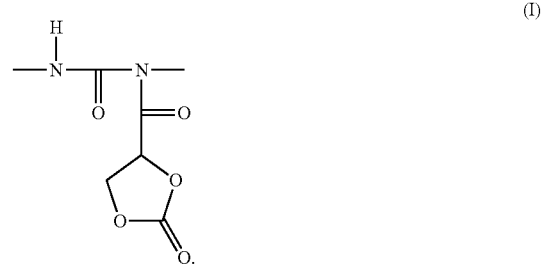

Moreover, the present invention suggests a process for the preparation of said polymer and the use of said curable organic polymer for the preparation of a cured composition and for the preparation of hydroxyurethanes.

16 Claims, No Drawings

(56) References Cited

FOREIGN PATENT DOCUMENTS

WO     WO 2011/157551 A1    12/2011
WO     WO 2013/092011 A1     6/2013

OTHER PUBLICATIONS

DeLos, F., et al., "Reactions of Carbodiimides. II. The Reactions of Dicyclohexylcarbodilmide with Carboxylic Acids in the Presence of Amines and Phenols [1,2]", Journal of American Chemical Society, Mar. 1, 1966, p. 1020-1023, vol. 88, Issue, 5. Abstract Only.

DeLos, F. et al., "Reactions of Carbodiimides. III. The Reactions of Carbodiimides with Peptide Acids [1,2]", Journal of American Chemical Society, Mar. 1, 1966, p. 1024-1030, vol. 88, Issue, 5. Abstract Only.

Constance D. Diakoumakos, et al., "Non-Isocyanate-Based Polyurethanes Derived Upon the Reaction of Amines with Cyclocarbonate Resins", Macromolecular Symposia, Sep. 2004, p. 37-46, vol. 3216, Issue1. Abstract Only.

Yoshio Iwakura, et al., "Synthesis of Poly(N-carbamoylamide) and Polyamide Throuh Polyaddition Reaction of Biscarbodiimide with Dicarboxylic Acid", Journal of Polymer Science Part C: Polymer Letters, Jul. 1968, p. 517-522, vol. 6, Issue 7. Abstract Only.

* cited by examiner

CURABLE ORGANIC POLYMER COMPRISING AT LEAST ONE ACYLUREA UNIT, ITS PREPARATION AND USE

CROSS REFERENCE TO RELATED APPLICATIONS

This application is a national stage application of International Application No. PCT/EP2015/066837, filed 23 Jul. 2015, which claims priority from European Patent Application No. 14185105.5, filed 17 Sep. 2014, which applications are incorporated herein by reference.

The present invention relates to a curable organic polymer comprising at least one acylurea unit represented by structural formula (I):

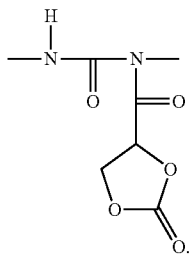

(I)

Moreover, the present invention relates to a process for the preparation of said polymer and to the use of said curable organic polymer for the preparation of a cured composition and for the preparation of hydroxyurethanes.

Polyurethanes based on polyisocyanates belong to the prior art. These are used for example as adhesives, sealants, casting compositions, as corrosion protection and for coatings. The high resistance to acids, alkalis and chemicals of the cured compositions obtained in this way are advantageous. However, monomeric low molecular weight (poly) isocyanate compounds are toxicologically unacceptable, especially if they are readily volatile or migrate. This holds especially true for application by the final customer.

Polyurethane systems can also be obtained starting from cyclic carbonate compounds, which are toxicologically acceptable. Thus, e.g. glycerol carbonate (4-(hydroxymethyl)-2-oxo-1,3-dioxolane) is regularly used in cosmetics.

WO 2011/157551 A1 discloses 2-oxo-1,3-dioxolane-4-carboxylic acid and esters thereof according to formula (V):

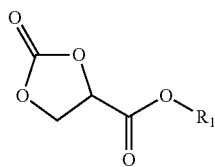

(V)

wherein $R_1$ represents a group selected from straight-chain or branched aliphatic groups, aryl groups, aralkyl groups and alkylaryl groups, and is preferably methyl or ethyl. Moreover, $R_1$ can be an n-valent radical, which may be substituted with at most n−1 further 2-oxo-1,3-dioxolane-4-carboxylic groups of formula (Va):

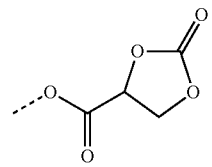

(Va)

The afore mentioned esters may be cured with amine hardeners to form hydroxyurethanes. However, WO 2011/157551 A1 neither discloses nor suggests the curable organic polymer of the present invention, nor its preparation and use.

WO 2013/092011 A1 discloses 2-oxo-1,3-dioxolane-4-carboxamides of formula (VI):

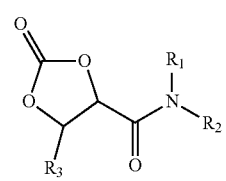

(VI)

wherein $R_1$ and $R_2$, in each case independently of one another, are selected from H, straight-chain, branched or cyclic $C_{1-12}$-alkyl groups, $C_{6-10}$-aryl groups, $C_{6-12}$-aralkyl groups and $C_{6-12}$-alkaryl groups or, together with the N atom to which they are bonded, form a 5- to 8-membered ring, and $R_3$ is selected from H and straight-chain, branched or cyclic $C_{1-12}$-alkyl groups, or $R_1$ and $R_3$ are each H, and $R_2$ is an n-valent radical, wherein n is an integer greater than 1, preferably 2-5, in particular 2-3, which is substituted with n−1 further 2-oxo-1,3-dioxolane-4-carboxamide groups of formula (VIa):

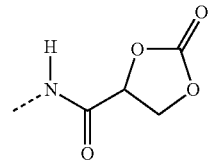

(VIa)

These 2-oxo-1,3-dioxolane-4-carboxamides, wherein $R_2$ is substituted, are accessible inter alia through reaction of 2-oxo-1,3-dioxolane-4-carboxylic acid with polyisocyanates, e.g.:

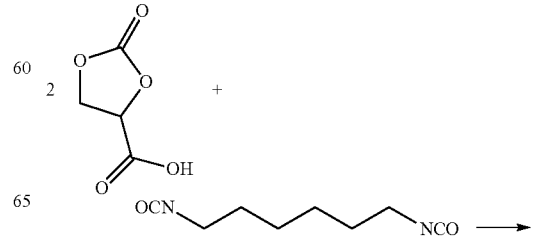

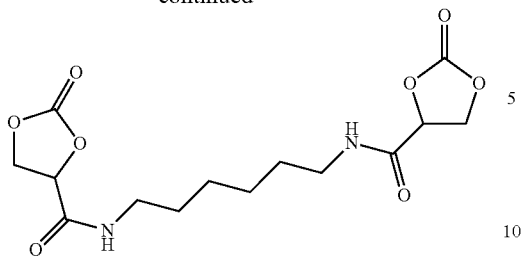

and can also be cured with amine hardeners to form hydroxyurethanes, e.g.:

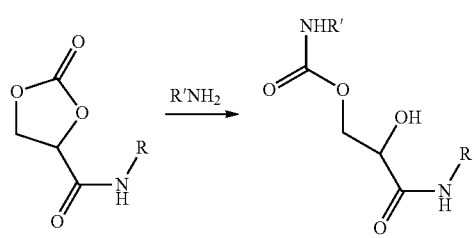

However, the carboxamide-based systems prepared from 2-oxo-1,3-dioxolane-4-carboxylic acid and polyisocyanates exhibit a limited number of crosslinkable cyclic carbonate groups depending on the functionality of the polyisocyanates. Commercial polyisocyanates with a functionality higher than 3, i.e. more than 3 isocyanate groups per molecule, are rare and suffer from very high viscosity and thus low workability.

EP 14 158 345.0 filed on Mar. 7, 2014, discloses 2-hydroxyethyl 2-oxo-1,3-dioxolane-4-carboxylates of formula (VII):

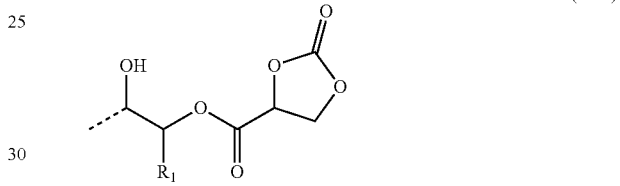

wherein one of $R_1$ and $R_2$ can be hydrogen. In particular, $R_1$ and $R_2$, if not hydrogen, and in each case independently of one another, are selected from straight-chain, branched or cyclic $C_{1-22}$-alkyl groups, preferably $C_{1-12}$-alkyl groups, $C_{6-12}$-aryl groups, $C_{6-18}$-aralkyl groups and $C_{6-18}$-alkaryl groups, wherein $R_1$ and/or $R_2$, in each case independently of one another, may comprise at least one additional functional group, selected from hydroxyl groups, ether groups, ester groups, epoxy groups, and double bonds, and wherein $R_2$ may be substituted with up to 10, preferably with 1 to 5, and in particular with 1 or 2 further 2-hydroxyethyl 2-oxo-1,3-dioxolane-4-carboxylic groups of formula (VIIa):

(VIIa)

wherein $R_1$ has the above meaning.

These 2-hydroxyethyl 2-oxo-1,3-dioxolane-4-carboxylates, wherein $R_1$ is substituted, are accessible inter alia through reaction of 2-oxo-1,3-dioxolane-4-carboxylic acid with polyepoxides, e.g.:

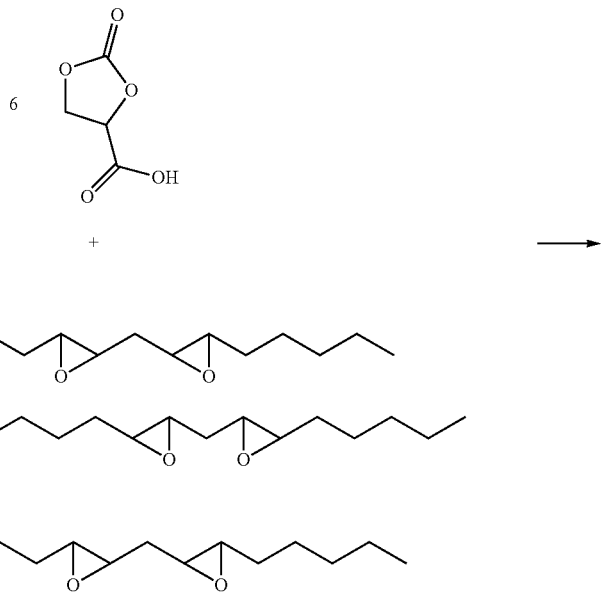

-continued

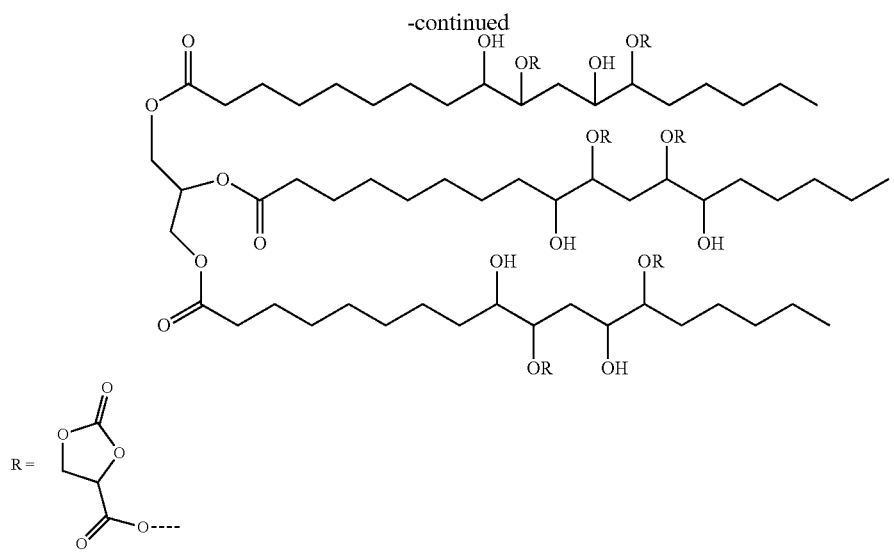

and can also be cured with amine hardeners to form hydroxyurethanes.

However, the 2-hydroxyethyl 2-oxo-1,3-dioxolane-4-carboxylate based systems prepared from 2-oxo-1,3-dioxolane-4-carboxylic acid and (poly)epoxides often suffer from poor curing behavior due to cleavage of the present ester groups by the amine hardener.

In summary, binders prepared according to the prior art usually bear 2 to 3 cyclocarbonate groups which can be reacted with amines to achieve crosslinking/curing. Thus, the crosslinking density is quite low and mainly soft and elastic cured materials are obtained.

It was thus the object of the present invention to essentially avoid at least some of the disadvantages of the prior art as described above. In general terms, the aim was to provide a 2-oxo-1,3-dioxolane-based system which is toxicologically acceptable, readily accessible, highly reactive with amine hardeners and is suitable as a preferably low-viscous, highly crosslinkable cyclocarbonate-functional binder. In order to obtain a high crosslinking density of the cured product and thus good mechanical and chemical properties, a high density of crosslinkable groups (f≥3) within the curable polymer (resin) was required. Both, working with (poly)isocyanates and the presence of aminelabile ester groups in the curable molecule should be avoided.

These objects have been achieved with the features of the independent claims. The dependent claims relate to preferred embodiments.

It was surprisingly found that suitable cyclocarbonate-functional binders with a plurality of crosslinkable groups can be prepared in an addition reaction between a carbodiimide and 2-oxo-1,3-dioxolane-4-carboxylic acid of formula (III) (here called "CYCA"). With this approach, every diimide (resin) can be easily converted into a curable polymer containing 2-oxo-1,3-dioxolane-functional acylurea units. The resulting binders are often stable and soluble in water which allows good workability and a VOC-free dosage form. Moreover, they can be cured with amines to give hydroxypolyurethanes with good chemical and mechanical properties and a high crosslinking density.

U.S. Pat. No. 4,328,138 describes curable acylurea polymers and coating compositions which cure by reaction of ethylenic unsaturation of the acyl group. The subject polymers are prepared by reaction of a polymeric carbodiimide with an ethylenically unsaturated monocarboxylic acid. Neither cyclic carbonates nor curing with amine hardeners and the preparation of hydroxyurethanes are mentioned or suggested.

DE 2714293 A1 describes polyhydroxyl compounds containing acyl urea groups useful in preparation of polyurethane foams. Examples for suitable carboxylic acids include saturated and unsaturated carboxylic acids. Crosslinking is not suggested.

In EP2628530 A1 crosslinking of oligocarbodiimides is described by using one or more di- and/or polycarboxylic acids and/or their water-soluble salts as crosslinkers for the preparation of microcapsules. Neither cyclic carbonates nor curing with amine hardeners and the preparation of hydroxyurethanes are mentioned or suggested.

It is thus a first subject matter of the present invention to provide a curable organic polymer comprising at least one acylurea unit represented by formula (I):

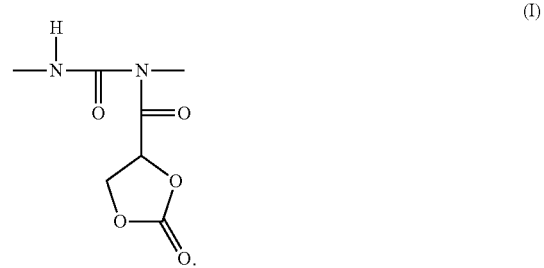

"Polymer", as this term is used throughout this specification, is intended to also include, besides true polymers, as well dimers, trimers and/or oligomers. In other words, the "polymer", as explained hereinbelow, can include one or more repeating units (n).

With other words, the structural formula (I) may also be defined as an acylurea unit formed via condensation reaction of a carbodiimide and 2-oxo-1,3-dioxolane-4-carboxylic acid.

The curable organic polymer comprises preferably 3 to 12, and in particular 4 to 8 acylurea units.

A preferred embodiment of the curable organic polymer is represented by structural formula (II):

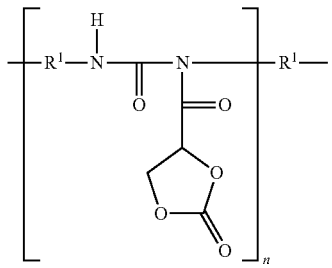

with n being the number of repeating units within the polymer chain, wherein n=1 to 12, and wherein $R^1$ is selected from straight-chain, branched or cyclic $C_{1-12}$-alkyl groups, $C_{6-10}$-aryl groups, $C_{6-14}$-aralkyl groups, and $C_{6-14}$-alkaryl groups, and wherein the polymer is terminated by terminal groups, which are, in each case independently of one another, selected from:

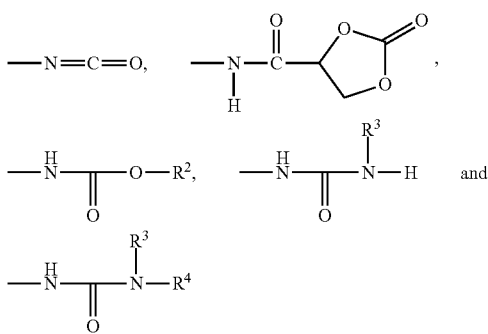

wherein $R^2$, $R^3$ and $R^4$ are independently of one another selected from straight-chain, branched or cyclic $C_{1-12}$-alkyl groups, $C_{6-10}$-aryl groups, $C_{6-12}$-aralkyl groups, $C_{6-12}$-alkaryl groups, $C_{1-4}$-alkoxy-$C_{2-120}$-(poly)(oxyalkylene) groups, polyester groups and polycarbonate groups.

Preferred examples of $R^1$ are:

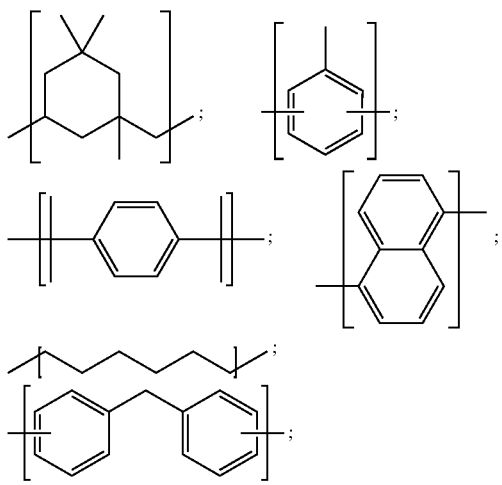

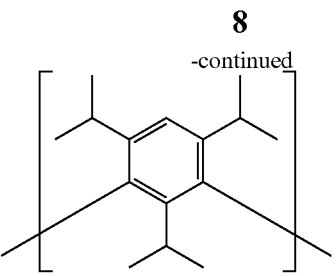

and combinations thereof.

Preferred meanings of $R^2$, $R^3$ and $R^4$ are e.g. methyl, ethyl, n-propyl, iso-propyl, n-butyl, sec-butyl, tert-butyl, n-pentyl, neo-5 pentyl, n-hexyl, 2-ethyl-n-hexyl, cyclohexyl, phenyl, benzyl, (alkyl)polyether groups (such as alkoxy-polyoxyethylene groups), (alkyl)polycarbonate groups, (alkyl)polyester groups, and combinations thereof. A most preferred meaning of $R^2$ is a (poly)(ethyleneoxy) alkyl group.

A second subject matter of the present invention is to provide a process for the preparation of the curable organic polymer of the invention by reacting 2-oxo-1,3-dioxolane-4-carboxylic acid of formula (III):

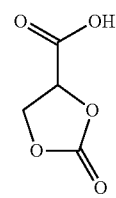

with a polymer comprising at least one carbodiimide unit represented by structural formula (IV):

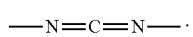

The structural formula (IV) is defined as a "carbodiimide" group, and a polymer comprising at least two carbodiimide units is defined as a "polycarbodiimide".

Organic carbodiimides are known, their chemistry is for example described in Chemical Reviews, Vol. 53 (1953), page 145 to 166 and Angewandte Chemie 74 (1962), page 801 to 806. (Poly)carbodiimides are prepared by exposure of a basic catalyst on sterically hindered isocyanates under $CO_2$ evolution. Basic catalysts can be e.g. phospholene or phospholidine catalysts.

Polymers comprising at least one carbodiimide unit as represented in formula (IV) can for example be prepared by carbodiimidisation of isocyanates. The resulting isocyanate-terminated polymers (polycarbodiimides) can either be used directly or further functionalized by partial or complete urethane formation of the terminal isocyanate groups with alcohols or by partial or complete reaction of the isocyanate group with a primary or secondary amine to give an urea. Polymers comprising at least one carbodiimide unit as represented in formula (IV) can also be prepared by partial reaction of diisocyanates with alcohols followed by carbodiimidization.

Examples of such (poly)carbodiimides are described in DE 4318979 A1 and in http://www.picassian.com/Default.aspx?cms=181 (retrieved Aug. 27, 2014). Such carbodiimides are for example Elastostab® H01, Elastostab® H02 (Elastogran GmbH), Picassian® XL-701, XL-702, XL-706, XL-725, XL-732 (Picassian) or Desmodur® XP 2802 (Bayer AG).

The reaction of carbodiimides with acids per se is also known in the prior art, especially for the activation of carboxylic acids, a process broadly used in peptide synthesis. Usually an O-acylurea is formed as a reactive intermediate which may rearrange to a N-acylurea in a 1,3-rearrangement [D. F. De Tar, R. Silverstein, J. Am. Chem. Soc. 1966, 88, 1013-1030]. The reaction of bis-carbodiimides with bis-carboxylic acids has for example been used by Iwakura et al. [Polymer Letters, 6, 517-522, 1968] to prepare poly(N-carbamoylamides).

Said process may suitably be carried out with a stoichiometric amount of 0.5 to 2.0 molecules of 2-oxo-1,3-dioxolane-4-carboxylic acid with respect to the carbodiimide unit of formula (IV). Preferably a stoichiometric amount of 0.8 to 1.2 equivalents of 2-oxo-1,3-dioxolane-4-carboxylic acid with respect to the carbodiimide unit of formula (IV) is used, in particular a stoichiometric amount of 1.0 equivalents of 2-oxo-1,3-dioxolane-4-carboxylic acid per carbodiimide unit of formula (IV) is used.

When the starting polycarbodiimides are obtained from diisocyanates by the carbodiimidization reaction as explained hereinabove, possessing —NCO end groups, additional excess of "CYCA" should preferably be provided in order to obtain polymers according to the invention having 2-oxo-1,3-dioxolane-4-carboxamide end groups.

A preferred embodiment of the process for the preparation of the curable organic polymer of the invention is that it is performed at 20-100° C., preferably 20-30° C. and that it is carried out in the presence of a solvent, preferably a solvent selected from acetone, THF, toluene and dioxane.

The process for the preparation of the curable organic polymer of the invention can also be performed in the presence of a catalyst selected from tertiary amines, organometallic compounds, and mixtures thereof. The tertiary amine can be selected e.g. from dimethylcyclohexylamine, 4-dimethylaminopyridine (DMAP), diazabicyclooctane (DABCO), and diazabicyclo-undecene (DBU); the organometallic compound can be selected e.g. from dibutyltin dilaurate (DBTL), a bismuth carboxylate such as bismuth octanoate or bismuth neodecanoate, a titanium or zirconium alkoxylate or carboxylate, and the like catalysts known in the prior art.

A further subject matter of the present invention is the use of the curable organic polymer of the invention for the preparation of a cured composition and for the preparation of hydroxyurethanes. Curing of the polymer can be achieved via reaction with amines, such as at least bifunctional amine hardeners.

Here in principle two different curing mechanisms are possible. First, a cured composition can be obtained via crosslinking of the polymer-bound cyclic carbonate group with an at least bifunctional amine. The formation of two different hydroxyurethanes is possible, namely hydroxyurethanes with primary or secondary hydroxyl groups. In this respect, it has been shown that the electron-withdrawing CON group diverts the reaction essentially in the direction of the hydroxyurethanes with secondary hydroxyl groups since, in the event of attack of the nucleophilic nitrogen atom, the negative charge on the oxygen atom which is closer to the COO group is better stabilized. Hydroxyurethanes with secondary hydroxyl groups have the additional advantage that the back-reaction is hindered.

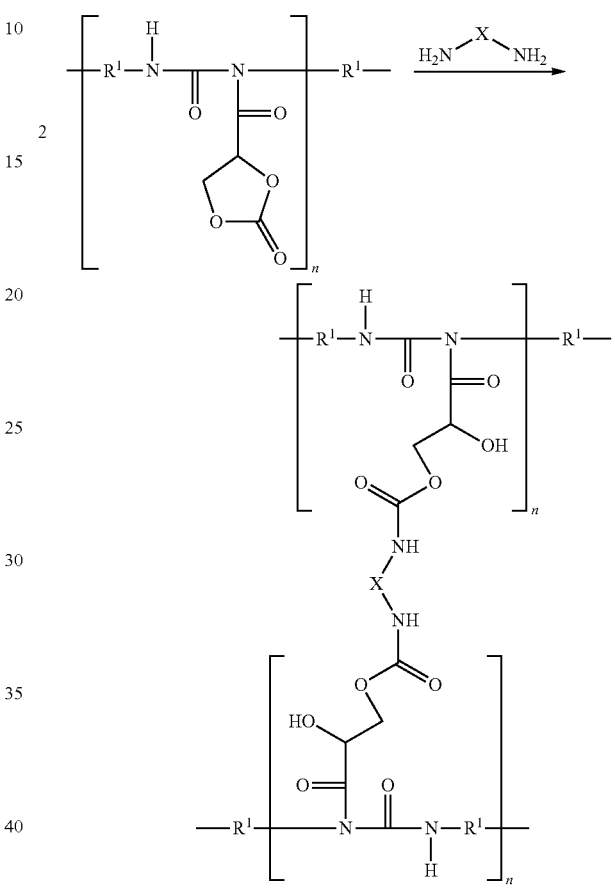

Second, an attack of the amine at the acylurea group is also conceivable to a lower extent, leading to the formation of a crosslinked network via hydroxyurethane and urea linkages. The cleavage reaction of the acylurea does not essentially reduce the crosslinking density as the second amino group can either react with a cyclic carbonate or with a diimide to achieve crosslinking. Thus, in both cases a dense network is formed. In the latter case an excess of amine, preferably an amine to cyclic carbonate ratio of 1:2 can further increase the crosslinking density.

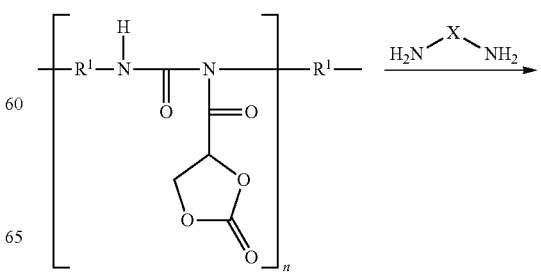

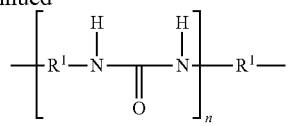

+

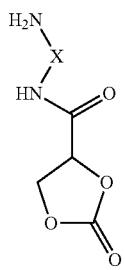

Suitable amines are primary and secondary amines with alkyl groups, aryl groups, aralkyl groups, and alkylaryl groups. Primary amines react much quicker than secondary amines; aliphatic amines react more quickly than aromatic amines. As regards the relative reactivities of different amines, compare C. Diakoumakos, D. Kotzev, Non-Isocyanate-Based Polyurethanes Derived upon the Reaction of Amines with Cyclocarbonate Resins, Macromol. Symp., 216, 37-46 (2004), in particular scheme 4 on p. 45. All of the amines specified therein and standard amine hardeners that are known to a person skilled in the art are suitable for carrying out the present invention. Relatively high molecular weight amines such as e.g. Jeffamine® from Huntsman Corp., polyether amines from BASF SE or polyethyleneimines such as Lupasol® from BASF SE are also suitable.

Theoretically, curing can also be achieved with other hardeners bearing nucleophilic groups such as OH or SH groups. Appropriate hardeners could be at least bifunctional alcohols or thiols.

One advantage of the organic polymer comprising at least one acylurea group of the invention lies in the high density of functional groups and thus the ability to achieve a high crosslinking density when curing with an at least bifunctional hardener such as an at least bifunctional amine is performed. Consequently hard and strong materials can be obtained with this type of reaction.

Moreover, when producing polyhydroxyurethane systems which are based on the organic polymer comprising at least one acylurea group of the invention, bubble formation as a result of formed $CO_2$ may not arise, even in the presence of moisture. Consequently, largely pore- and bubble-free coatings are possible, which is sometimes problematic for classic polyurethane systems. Additionally, systems based on the organic polymer of the invention can be dissolved or dispersed in water which is difficult for isocyanate based systems. The possibility to use waterborne systems enables the use of the polymer of the invention in a low viscous and VOC-free dosage-form. Furthermore, the thermal stability of such polyhydroxyurethane systems is also higher than the stability of classic polyurethane systems.

The present invention is now illustrated in more detail by reference to the examples hereinbelow.

EXAMPLES

Example 1: Preparation of a TDI-Carbodiimide and Subsequent Reaction with CYCA

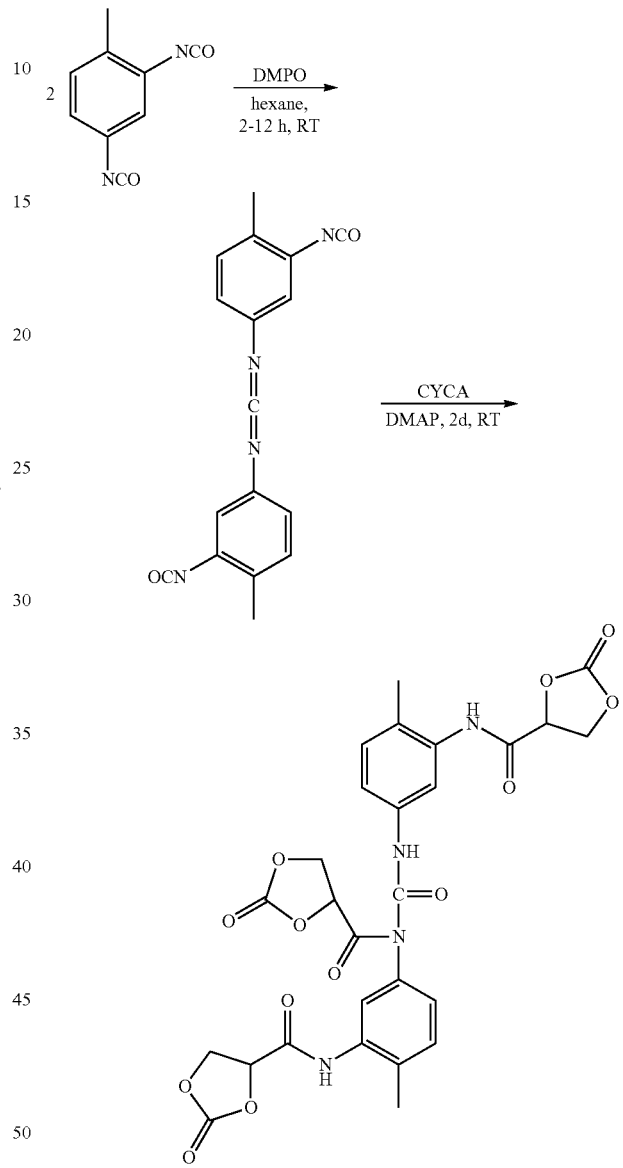

34.83 g TDI (0.2 mol) was dissolved in 66 ml hexane and 0.25 g DMPO (Phospholene oxide, Lubio Polykat® 1, Schäfer-Additivsysteme GmbH) was added. The reaction mixture was stirred at ambient temperature for 12 h, and a white precipitate formed. The solid product was filtered off, washed with petrol ether and recrystallized from hexane.

$^1$H-NMR (400 MHz, CDCl$_3$): δ=7.12-6.86 (m, 6H, Ar), 2.29 (s, 6H, CH$_3$) ppm. IR (v, cm$^{-1}$): 2361 (w), 2344 (w), 2273 (s, NCO), 2131 (s, diimide), 2098 (s, diimide), 1717 (w), 1600 (s), 1562 (m), 1512 (m), 1477 (s), 1287 (w), 1224 (w), 1196 (m), 1145 (w), 1073 (m), 993 (m), 917 (m), 887 (s), 823 (s), 751 (w), 718 (m), 591 (s), 548 (s).

2.25 g of the obtained TDI-carbodiimide (7.4 mmol) was dissolved in 60 ml dry THF and 2.93 g (22.2 mmol)

2-oxo-1,3-dioxolane-4-carboxylic acid (CYCA) was added. The reaction mixture was stirred at ambient temperature until the carbodiimide was reacted completely (12 h, IR control). Afterwards, 0.04 g DMAP (4-dimethylamino pyridine, 0.3 mmol) were added and the reaction mixture was heated to 65° C. until the TDI-carbodiimide was completely reacted (12 h). During this period a white precipitate formed which was filtered off and dried in vacuo. The solid product was obtained as a white powder in quantitative yield.

IR (v, cm$^{-1}$): 3356 (bw), 2975 (m), 2870 (m), 2275 (w), 1817 (s, cyclocarbonate), 1704 (s), 1592 (m), 1536 (s), 1451 (m), 1413 (w), 1385 (w), 1220 (m), 1155 (s), 1058 (s), 899 (m), 815 (w), 766 (w), 656 (m), 532 (w).

Example 2: Reaction of TMXDI-Carbodiimides with CYCA

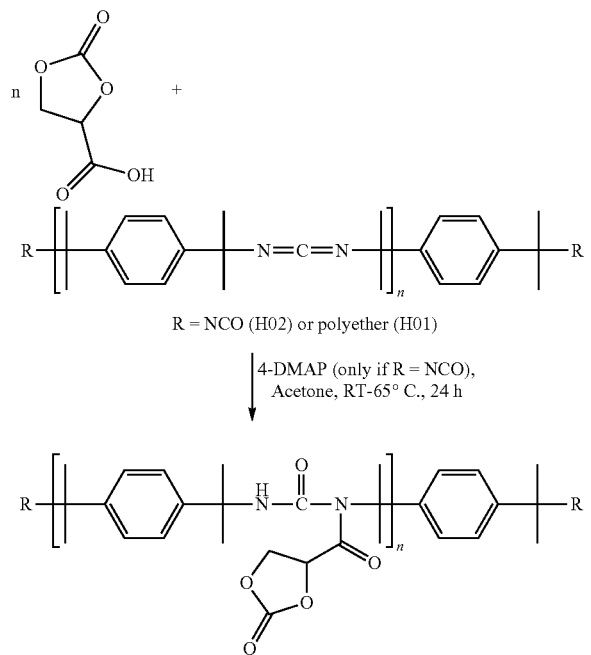

a) 12.5 g Elastostab® H02 (NCO-terminated TMXDI-carbodiimide of BASF, 7% Isocyanate, 14% Carbodiimide) was dissolved in 80 g dry acetone and 8.53 g (0.065 mol, excess) 2-oxo-1,3-dioxolane-4-carboxylic acid (CYCA) was added. The reaction mixture was stirred at ambient temperature until the carbodiimide was completely reacted (12 h, IR control). Afterwards 0.16 g DMAP (1.3 mmol) was added, and the reaction mixture was heated to 65° C. until the TMXDI-carbodiimide was completely reacted (12 h). The solvent was evaporated and the product was obtained as white powder in quantitative yield.

b) 277 g Elastostab® H01 (polyether-terminated TMXDI-carbodiimide of BASF, 7% Carbodiimide) was dissolved in 1 l dry acetone and 64 g (0.49 mol) 2-oxo-1,3-dioxolane-4-carboxylic acid (CYCA) was added. The reaction mixture was stirred at ambient temperature until the carbodiimide was completely reacted (12 h, IR control). The solvent was evaporated, and the product was obtained as white powder in quantitative yield.

IR (v, cm$^{-1}$): 3310 (bw), 2974 (m), 2862 (m), 1822 (m, cyclocarbonate), 1710 (m), 1693 (m), 1521 (w), 1460 (w), 1386 (w), 1252 (m), 1149 (m), 1065 (s), 907 (s), 799 (w), 766 (w), 708 (w), 655 (w), 499 (w).

Example 3: Reaction of IPDI-Carbodiimide with CYCA 28.39 g IPDI-carbodiimide (of BASF, 6.8% diimide content, 60% solution in Proglyde® DMM,) was dissolved in 100 ml dry THF, and 3.74 g (0.18 mol) 2-oxo-1,3-dioxolane-4-carboxylic acid (CYCA) was added. The reaction mixture was stirred at ambient temperature until the carbodiimide was completely reacted (12 h, IR control). The solvent was evaporated and the product was obtained as a viscous yellow oil in quantitative yield.

IR (v, cm$^{-1}$): 2973 (m), 2862 (m), 2122 (w), 1823 (m, cyclocarbonate), 1692 (m), 1539 (w), 1460 (m), 1366 (w), 1245 (w), 1066 (s), 907 (m), 766 (w), 655 (w).

Example 4: Curing of Acylurea-Based Cyclocarbonate Binders

The reaction products of Examples 2a and 2b were cured with different bi/tri-functional amine hardeners. The respective reaction products, amine hardeners, amounts (mol), cyclocarbonate ("Cyc"): amine ratio, and the curing behavior are given in Table 1 hereinbelow.

TABLE 1

| | Binder/Amine | Amount | "Cyc":Amine | Curing Behavior |
|---|---|---|---|---|
| 1 | Ex. 2a, 60% solution in THF | 0.005 | 1:1 | Exothermic, fast curing, potlife |
| | IPDA | 0.005 | | 10 min, brittle, tack-free |
| 2 | Ex. 2a, 60% solution in THF | 0.005 | 1:1 | Very exothermic, fast curing, |
| | DYTEK ® EP diamin | 0.005 | | potlife 10 min, brittle, tack-free |
| 3 | Ex. 2a, 60% solution in THF | 0.005 | 1:1 | Exothermic, fast curing, potlife |
| | 1,3-Diamino-2,2-dimethylpropan | 0.005 | | 10 min, brittle, tack-free |
| 4 | Ex. 2a, 60% solution in THF | 0.005 | 1:1 | Exothermic, fast curing, potlife |
| | Diethylentriamin | 0.005 | | 10 min, brittle, tack-free |
| 5 | Ex. 2a, 60% solution in THF | 0.005 | 1:1 | Gelling, no complete curing |
| | Jeffamin D 400 | 0.005 | | |
| 6 | Ex. 2a, 60% solution in THF | 0.005 | 1:1 | Potlife 5 min, tacky |
| | Polyetheramin T 403 | 0.005 | | |
| 7 | Ex. 2a, 60% solution in THF | 0.005 | 1:1 | Exothermic, fast curing, potlife |
| | 1,3-Cyclohexanbis(methylamin) | 0.005 | | 10 min, brittle, tack-free |
| 8 | Ex. 2b, 70% solution in H$_2$O | 0.005 | 1:1 | Tacky, soft and elastic |
| | IPDA | 0.005 | | |
| 9 | Ex. 2b, 70% solution in H$_2$O | 0.005 | 1:2 | Hard and brittle, tack-free, |
| | IPDA | 0.010 | | completely cured |

TABLE 1-continued

| Binder/Amine | Amount | "Cyc":Amine | Curing Behavior |
| --- | --- | --- | --- |
| 10 Ex. 2b, 70% solution in H$_2$O TMD | 0.008 0.016 | 1:2 | Cured, tacky |
| 11 Ex. 2b, 70% solution in H$_2$O Without Amine | 0.003 — | — | No curing |

Curing of acylurea-based cyclocarbonate binders can be observed with various amines. Best results, i.e. tack-free, stable and hard films with good mechanical properties were obtained with the modified Elastostab® H01 system (i.e. Ex. 2a) with an excess of IPDA.

The invention claimed is:

1. A process for the preparation of hydroxyurethanes comprising crosslinking a curable organic polymer comprising at least one acylurea unit represented by structural formula (I):

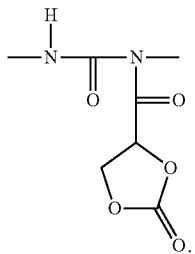

(I)

at its bound cyclic carbonate group with an at least bifunctional amine.

2. The process of claim 1, wherein the curable organic polymer comprises 3 to 12 acylurea units.

3. The process of claim 1, characterized in that the curable organic polymer is represented by structural formula (II):

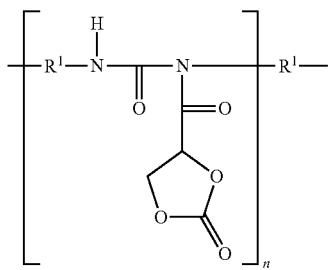

(II)

with n=1 to 12 and wherein R$^1$ is selected from straight-chain, branched or cyclic C$_{1-12}$-alkyl groups, C$_{6-10}$-aryl groups, C$_{6-14}$-aralkyl groups, and C$_{6-14}$-alkaryl groups and in that the polymer is terminated by terminal groups, which are, in each case independently of one another, selected from:

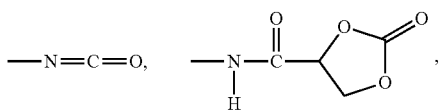

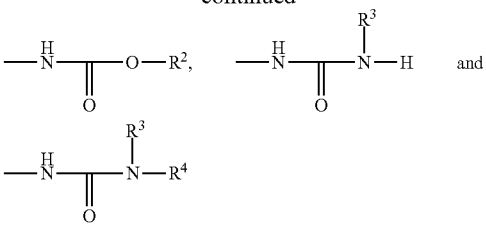

wherein R$^2$, R$^3$ and R$^4$ are independently of one another selected from straight-chain, branched or cyclic C$_{1-12}$-alkyl groups, C$_{6-10}$-aryl groups, C$_{6-12}$-aralkyl groups, C$_{6-12}$-alkaryl groups, C$_{1-4}$-alkoxy-C$_{2-120}$-(poly)(oxyalkylene) groups, polyester groups and polycarbonate groups.

4. The process of claim 3, characterized in that R$^2$ is an alkoxy-polyoxyethylene group with a molecular weight of 76 to 2000.

5. The process according to claim 1, wherein the curable organic polymer is prepared by reacting 2-oxo-1,3-dioxolane-4-carboxylic acid of formula (III):

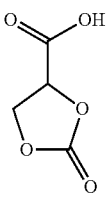

(III)

with a polymer comprising at least one carbodiimide unit represented by structural formula (IV):

(IV)

6. The process of claim 5, characterized in that 0.5 to 2.0 equivalents of 2-oxo-1,3-dioxolane-4-carboxylic acid of formula (III) are used per carbodiimide unit of formula (IV).

7. The process of claim 5, characterized in that the reaction is performed at 20-100° C.

8. The process of claim 5, characterized in that the reaction is carried out in the presence of a solvent.

9. The process of claim 5, characterized in that the reaction is performed in the presence of a catalyst selected from tertiary amines, organometallic compounds, and mixtures thereof.

10. The process according to claim 3, wherein the curable organic polymer is prepared by reacting 2-oxo-1,3-dioxolane-4-carboxylic acid of formula (III):

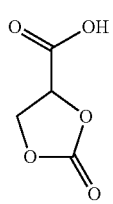 (III)

with a polymer comprising at least one carbodiimide unit represented by structural formula (IV):

 (IV)

11. The process of claim 5, characterized in that the reaction is performed at 20-30° C.

12. The process of claim 5, characterized in that the reaction is carried out in the presence of a solvent selected from acetone, THF, toluene and dioxane.

13. The process of claim 2, wherein the curable organic polymer comprises 4 to 8 acylurea units.

14. A hydroxyurethane prepared according to the process of claim 1.

15. The process of claim 10, characterized in that the reaction is performed at 20-30° C.

16. The process of claim 10, characterized in that the reaction is carried out in the presence of a solvent selected from acetone, THF, toluene and dioxane.

* * * * *